United States Patent [19]
LaForge

[11] 3,994,144
[45] Nov. 30, 1976

[54] DOUBLE SWIVEL COUPLING

[76] Inventor: Ronald LaForge, 3 pondfield Drive North, Chappaqua, N.Y. 10514

[22] Filed: Aug. 21, 1975

[21] Appl. No.: 606,531

[52] U.S. Cl. ................................. 64/9 R; 64/16; 64/18; 64/6; 64/21
[51] Int. Cl.² ........................................... F16D 3/18
[58] Field of Search ................. 64/18, 21, 8, 7, 6, 64/16, 9

[56] References Cited
UNITED STATES PATENTS

| | | | |
|---|---|---|---|
| 2,197,070 | 4/1940 | Cook et al. | 64/9 R |
| 2,659,217 | 11/1953 | Talbot | 64/16 |
| 2,896,430 | 7/1959 | Olson | 64/16 |
| 3,013,411 | 12/1961 | Wahlmark | 64/21 |
| 3,030,784 | 4/1962 | Minik | 64/18 |
| 3,652,043 | 3/1972 | Jones | 64/18 |

*Primary Examiner*—Samuel Scott
*Assistant Examiner*—Randall Heald
*Attorney, Agent, or Firm*—Curtis Ailes

[57] ABSTRACT

Universal joint having a first cylindrical member with a cylinder axis perpendicular to the torque transmission axis and with a ribbed and slotted cylinder surface, a second member forming a cage around the first member and having an exterior periphery defining a second ribbed and slotted cylinder surface with the cylinder axis perpendicular to the first-mentioned cylinder axis, and a third member forming a cage around the second member.

8 Claims, 4 Drawing Figures

FIG. 3
FIG. 4
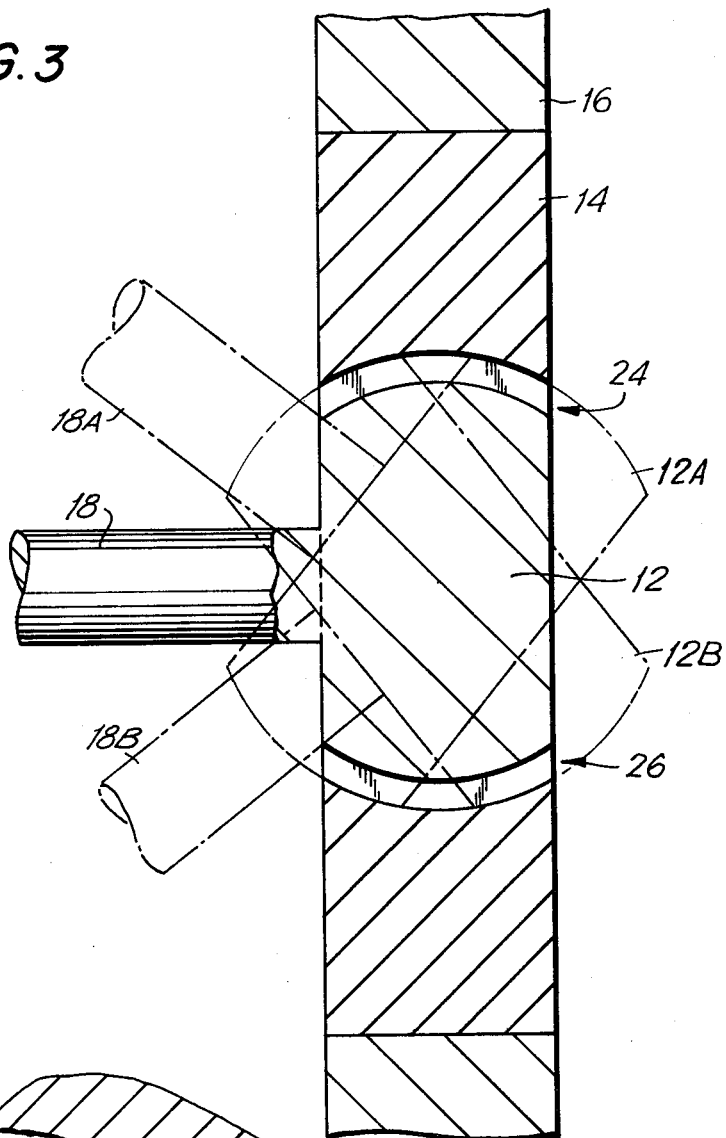
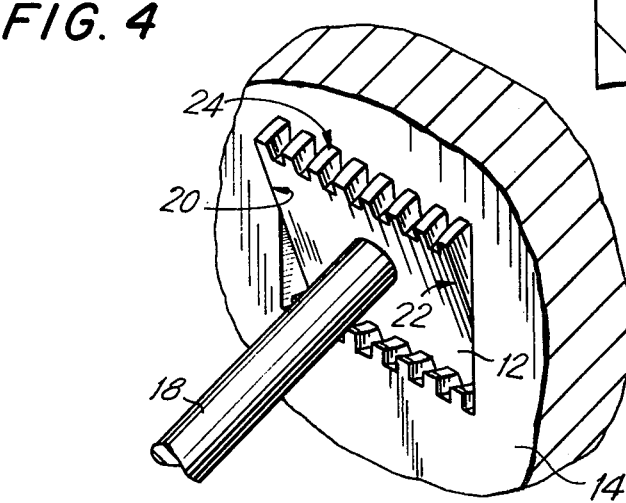

DOUBLE SWIVEL COUPLING

This invention relates to a new mechanical coupling for connecting two rotatable drive members or shafts where the shafts are not always in perfect axial alignment. Such couplings are often referred to as universal joints, or as flexible couplings, because they accommodate for changes in relative alignment between the axes of the two rotatable shafts or members which are joined by the coupling. Such couplings are commonly used, for instance, on the drive shafts of automotive vehicles.

Prior flexible torque transmission couplings or universal joints commonly possess a number of limitations and disadvantages. For instance, such universal joints are typically awkward and bulky in construction, and subject to accelerated wear which commonly results in looseness and breakage. Furthermore, such prior couplings are often high in first cost and difficult to service.

Accordingly, important objects of the present invention are to provide improved swivel torque transmission couplings which are characterized by economy, simplicity, ease of assembly and disassembly, and high torque transmission capacity within a compact structure.

Other objects and advantages of the invention will be apparent from the following description and the accompanying drawings.

In carrying out the invention, there is provided a double swivel torque transmission coupling comprising first and second and third torque transmission members, said second member being connected between said first and third members and said first and third members being adapted to be connected to different rotatable bodies which do not always have aligned axes of rotation and between which torque is to be transmitted, said first torque transmission member being operable for rotation and transmission of torque on a first axis, said first torque transmission member having an exterior shape which is substantially a right circular cylinder having an axis perpendicular to said first axis, said second torque transmission member having a central opening extending therethrough and defining a shape which is substantially a first central section of a right circular cylinder substantially corresponding to the circular cylinder of said first torque transmission member and positioned and arranged to surround and form a cage for said first torque transmission member, the axis of said first cylinder section substantially corresponding to said axis of said circular cylinder of said first torque transmission member and being substantially centered within said second member, the exterior peripheral surfaces of said second torque transmission member defining a shape which is substantially a central section of a second right circular cylinder, the axis of said second cylinder section being perpendicular to the axis of said first cylinder section and substantially perpendicular to said first axis, the axis of said second cylinder section being substantially centered within said second member, said third torque transmission member having a central opening extending therethrough and defining a shape which is substantially a central section of a right circular cylinder substantially corresponding to said second cylinder section defined by the exterior surface of said second member and positioned and arranged to surround and form a cage for said second member.

In the accompanying drawings:

FIG. 3 is an enlarged partial side view taken at section 3—3 of FIG. 1; and

FIG. 4 is a partial perspective view corresponding to the central portion of FIG. 1 and showing the central member of the structure swiveled to accommodate for a downward tilt of the axis of the shaft connected thereto.

Figure 1:
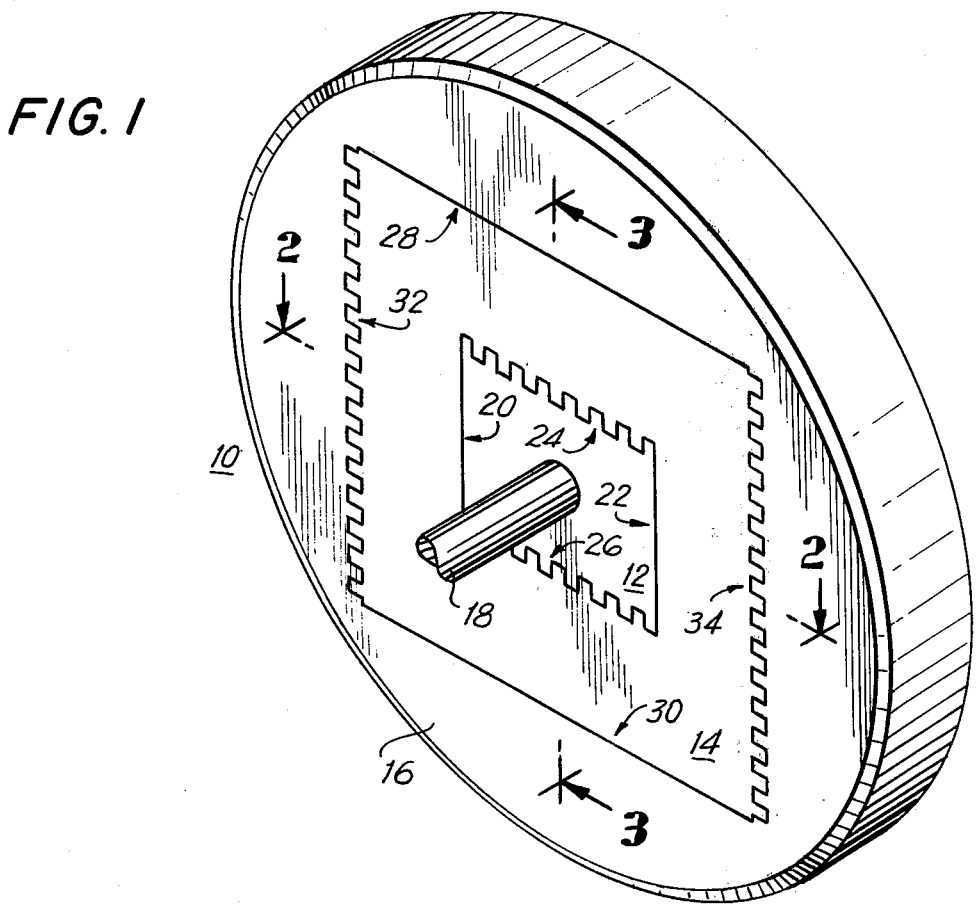
FIG. 1 is an end perspective view of a preferred embodiment of the invention.

Referring in more detail to FIG. 1, there is shown a double swivel torque transmission coupling designated as a whole as 10, and including a first torque transmission member 12, a second torque transmission member 14, and a third torque transmission member 16. As illustrated in the drawing, and as will be more apparent from the following description, the second member 14 is connected between the first member 12 and the third member 16. The first member 12 and the third member 16 are adapted to be connected to different rotatable bodies which have axes of rotation which are not always aligned, and between which torque is to be transmitted. Thus, for instance, member 12 is connected to a shaft 18. While not specifically indicated in the drawing, member 16 is adapted to be connected to another rotatable body. For instance, member 16 may conveniently comprise a part of the fly-wheel of an engine, or a part of the output end of the clutch mechanism of an automotive vehicle, or member 16 may be connected to such parts.

The double swivel effect is obtained in the present invention by providing each of the members 12 and 14 as cylinders, or cylinder sections with axes generally mutually perpendicular to one another, and perpendicular to the axis of rotation, as represented for instance by the axis of shaft 18. It is another preferred feature of the invention that the cylindrical surfaces of the members are formed with a combination of ribs and slots. Thus, the edges of the cylindrical surfaces of each of the members 12 and 14 are clearly identifiable in FIG. 1. For instance, as illustrated in the drawing, member 12 consists of a central section of a right circular cylinder, having axial ends indicated at 20 and 22, and having ribbed and slotted cylindrical surfaces indicated generally at 24 and 26. These ribbed and slotted cylindrical surfaces permit tilting of member 12 about a horizontal axis with respect to member 14 to accommodate for misalignment of shaft 18. A downward tilt of shaft 18 and member 12 is illustrated, for instance, in the perspective view of FIG. 4. This downward tilt of member 12 with respect to member 14 is also illustrated in the sectional side view taken at section 3—3 of FIG. 1 illustrated in FIG. 3. The downward tilted position is illustrated by the shaft position 18B shown in phantom, and the corresponding member 12 position is shown in phantom at 12B. A similar upward tilt is shown in phantom in a similar manner at 18A and 12A.

As indicated by the drawings, member 14 is provided with a central opening which extends through member 14, and which is also a central section of a right circular cylinder substantially corresponding to the circular cylinder formed by the exterior surfaces of member 12, and complementary thereto. This is for the purpose of having member 14 surround and form a cage for member 12 to confine member 12 while permitting the tilting motion, and to exchange torque forces with member 12.

The structure of the outer periphery of member 14 is analogous to the outer periphery of member 12. That is, the outer periphery of member 14 also defines a central section of a right circular cylinder, the cylinder ends being indicated at 28 and 30, and the curved sides of the cylinder being indicated at 32 and 34. Thus, as illustrated in the drawing, the axis of the cylinder of member 14 is vertical, and perpendicular to the axis of the cylinder of member 12, and also generally perpendicular to the axis of rotation of the coupling as represented by the normal axis of shaft 18.

The member 16 is provided with a central through-opening which is complementary to the outer peripheral surfaces of member 14, and which thus serves as a cage for member 14. The cylindrical surface engagements between the members 14 and 16 permit for tilting of the axis of the shaft 18 with respect to member 16 in the horizontal direction, as illustrated, for instance, in the top sectional view of FIG. 2. Thus, a tilted-left position of shaft 18 is shown in phantom at 18C, and the corresponding tilted position of member 14 is indicated in phantom at 14C. Similarly, the tilted-right position of shaft 18, and member 14 is indicated in phantom at 18D and 14D. Again, the cylindrical surfaces at 32 and 34 are illustrated with the preferred structure of slots and ribs, with corresponding and complementary slots and ribs in mating portions of the cylindrical interior surfaces of member 16.

It is preferred that the axes of the respective cylinders formed by the outer surfaces of members 12 and 14 intersect with one another, and with the axis of the entire coupling as represented by the axis of shaft 18 at the center of the coupling structure, and that these axes be substantially centered within the thickness of the coupling structure along the axis of shaft 18. Thus, the member 16 surrounding member 14, and member 14 surrounding member 12, serve to each form a cage which confines the associated cylinder section.

While it is quite apparent that the invention is operable with smooth, rather than ribbed and slotted, cylindrical surfaces, the ribbed and slotted surfaces are preferred because they provide a more durable and wear-resistant connection which is more efficient in transmitting torque between the interfitted members. Furthermore, while ribs and slots of varying dimensions may be employed in combination in the structure of the invention, the preferred structure is the one shown in which uniform complementary ribs and slots are employed. Further, while ribs and slots of various shapes may be employed, the substantially square rib and slot cross-sections illustrated in the drawings are preferred for maximum interlocking effect, and for maximum torque transmission capability.

The physical proportions of the various parts of the coupling may be changed and adjusted to suit particular requirements. Furthermore, in order to provide for uniform rotational output speed, the couplings of the invention may be conveniently installed in pairs, with the axes of the corresponding swivel connections provided by members 12 and 14 of the respective couplings generally arranged in parallel so as to provide compensation by one coupling for non-uniformities in rotational speed introduced by the other coupling.

Figure 2:
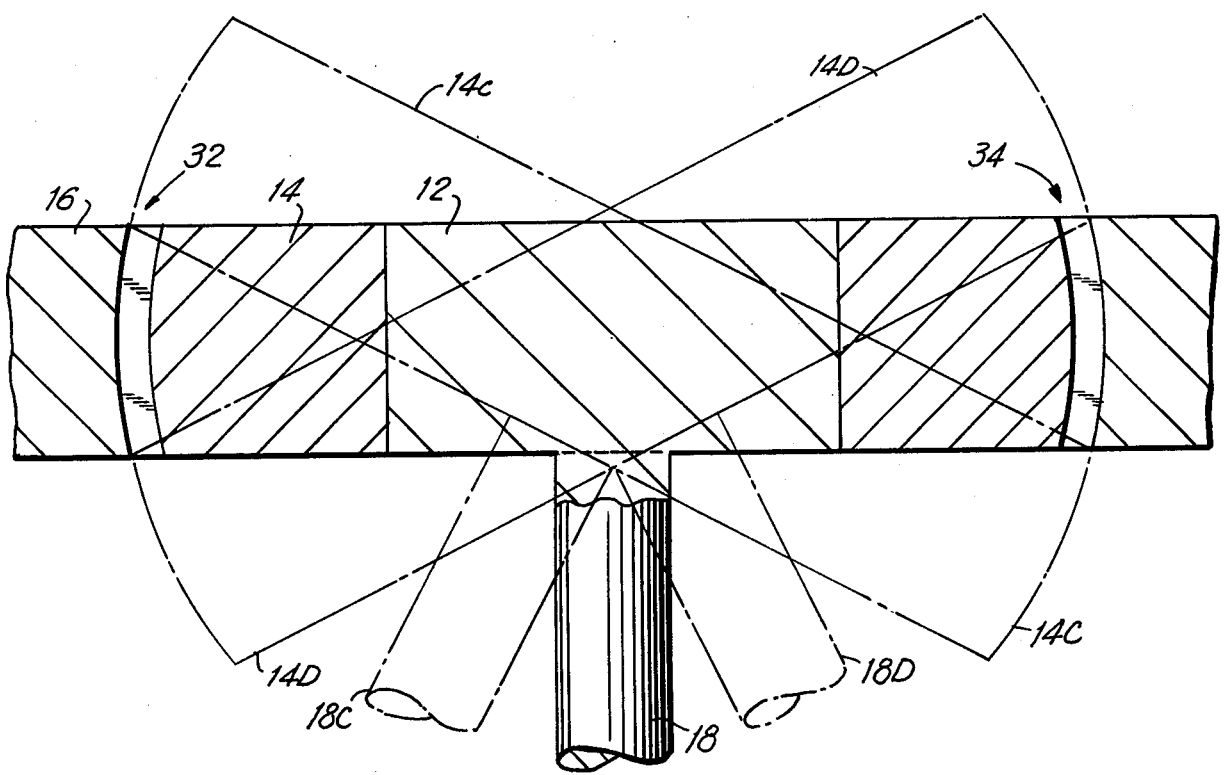
FIG. 2 is an enlarged partial top view taken at section 2—2 of FIG. 1.

The embodiment of the coupling of the present invention illustrated in the drawings is designed for axial misalignment between the coupled rotatable bodies limited to not more than ten or fifteen degrees, although greater angles of tilt are illustrated in both FIGS. 2 and 3. However, at the maximum angle of tilt illustrated in FIG. 2, an angle of about 27°, the member 14 is about to become disengaged from the cage formed by member 16. Thus, this illustrates an easy mode of disassembly, and reassembly, of the member 14 within the cage formed by member 16. Furthermore, if it is possible to disconnect shaft 18 from member 12, member 12 may also be rotated sufficiently within the cage formed by member 14 to permit removal. Alternatively, the proportions of the device may be changed to provide a larger cylinder diameter for member 12 in relation to the device thickness, to thus permit sufficient rotation of member 12 within member 14 for disassembly without disconnecting shaft 18 from member 12.

Thus, while it is possible to form the outer member 16 in several parts which are bolted together in order to form the cage around member 14, it is preferred in the practice of the invention to form member 16 as a unitary structure, and to assemble member 14 within the cage formed by member 16 by simply sliding member 14 into member 16 in the extreme tilted position, and then rotating member 14 within member 16 in order to engage the mating cylindrical surfaces. Thus, for instance, the initial assembly position may be characterized as the position shown in FIG. 2 in phantom at 18D and 14D. Similarly, while it is possible to form member 14 in several parts which are bolted together to form the cage around member 12, it is preferred to construct member 14 as a unitary structure into which member 12 is assembled by rotation.

In order to permit such assembly and disassembly, it is preferred that there be no axles or pins at the ends of the cylinder section axes of members 12 or 14, the axes of rotation being determined entirely by the engagement of the outer cylindrical surfaces with the associated cages.

The term "central section of a circular cylinder", as used in this specification, generally means that part of a circular cylinder included between two planes generally parallel to the cylinder axis and spaced on opposite sides of the cylinder axis, the planes preferably being mutually parallel to one another, and equally spaced on opposite sides of the cylinder axis.

One major advantage of the invention over conventional crossed-pin universal joint couplings is that substantially larger bearing surface areas are provided by the cylindrical surfaces of members 12, 14, and 16. These larger bearing surfaces not only provide increased strength, but increased resistance to wear, with consequent longer service life without the development of excessive clearances or spaces due to wear between bearing surfaces.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A double swivel torque transmission coupling comprising
    first and second and third torque transmission members,
    said second member being connected between said first and third members and said first and third members being adapted to be connected to different rotatable bodies which do not always have aligned axes of rotation and between which torque is to be transmitted, said first torque transmission member being operable for rotation and transmission of torque on a first axis, said first torque transmission member having an exterior shape which is substantially a right circular cylinder having an axis perpendicular to said first axis, said second torque transmission member having a central opening extending therethrough and defining a shape which is substantially a first central section of a right circular cylinder substantially corresponding to the circular cylinder of said first torque transmission member and positioned and arranged to surround and form a cage for said first torque transmission member, the axis of said first cylinder section substantially corresponding to said axis of said circular cylinder of said first torque transmission member and being substantially centered within said second member, the exterior peripheral surfaces of said second torque transmission member defining a shape which is substantially a central section of a second right circular cylinder, the axis of said second cylinder section being perpendicular to the axis of said first cylinder section and substantially perpendicular to said first axis, the axis of said second cylinder section being substantially centered within said second member, said third torque transmission member having a central opening extending therethrough and defining a shape which is substantially a central section of a right circular cylinder substantially corresponding to said second cylinder section defined by the exterior surfaces of said second member and positioned and arranged to surround and form a cage for said second member.

2. A coupling as claimed in claim 1 wherein
said first torque transmission member is limited to a central section of a right circular cylinder.

3. A coupling as claimed in claim 2 wherein
the cylindrical surfaces of said first member are ribbed and slotted,
and wherein the cylindrical surfaces of the right circular cylinder shape defined by the central opening within said second member is also provided with ribs and slots which are complementary to the ribs and slots of said first member to interfit therewith.

4. A coupling as claimed in claim 2 wherein
the exterior cylindrical surfaces of said second member are ribbed and slotted,
and wherein the cylindrical surfaces defined by the interior opening of said third member is also provided with ribs and slots which are complementary to the ribs and slots of the exterior cylindrical surfaces of said second member to engage and fit therewith.

5. A coupling as claimed in claim 2 wherein
all of said cylindrical surfaces of said first, second and third members are ribbed and slotted,
with the ribs and slots of engaging cylindrical surfaces being complementary and interfitting with one another.

6. A coupling as claimed in claim 5 wherein
said ribs and slots are all of substantially uniform width and depth.

7. A coupling as claimed in claim 6 wherein
said ribs and slots are all rectangular in cross-section.

8. A coupling as claimed in claim 7 wherein
said ribs and slots are all of substantially square cross-section.

* * * * *